(12) United States Patent
Grandin (10) Patent No.: US 10,613,872 B2
(45) Date of Patent: Apr. 7, 2020

(54) MEMORY SYSTEM WITH SIMULATED MEMORY PROCESS

(71) Applicant: ELBIT SYSTEMS OF AMERICA, LLC, Fort Worth, TX (US)

(72) Inventor: Keith Grandin, Aledo, TX (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 78 days.

(21) Appl. No.: 15/960,261

(22) Filed: Apr. 23, 2018

(65) Prior Publication Data

US 2018/0239610 A1    Aug. 23, 2018

Related U.S. Application Data

(62) Division of application No. 14/705,516, filed on May 6, 2015, now Pat. No. 9,983,885.

(51) Int. Cl.
*G06F 9/44* (2018.01)
*G06F 9/4401* (2018.01)
*G06F 1/14* (2006.01)
*G06F 3/06* (2006.01)

(52) U.S. Cl.
CPC .............. *G06F 9/4401* (2013.01); *G06F 1/14* (2013.01); *G06F 3/0614* (2013.01); *G06F 3/0632* (2013.01); *G06F 3/0688* (2013.01)

(58) Field of Classification Search
CPC .. G06F 11/1417; G06F 11/1666; G06F 11/20; G06F 9/4401; G06F 11/142; G06F 11/1441; G06F 15/7814; G06F 9/24; G06F 1/14; G06F 3/0614; G06F 3/0632; G06F 3/0688

See application file for complete search history.

(56) References Cited

U.S. PATENT DOCUMENTS

| | | |
|---|---|---|
| 5,388,267 A | 2/1995 | Chan |
| 5,822,581 A | 10/1998 | Christeson |
| 5,831,834 A | 11/1998 | Landolf |
| 6,230,285 B1 | 5/2001 | Sadowsky |
| 6,438,687 B2 | 8/2002 | Klein |
| 6,651,188 B2 | 11/2003 | Harding |
| 7,039,199 B2 | 5/2006 | Rui |
| 7,886,190 B2 | 2/2011 | Rothman |
| 2001/0052067 A1 | 12/2001 | Klein |
| 2004/0025003 A1 | 2/2004 | Stevens |
| 2004/0073842 A1 | 4/2004 | James |
| 2004/0153724 A1 | 8/2004 | Nicholson |
| 2004/0158702 A1 | 8/2004 | Tasaki |
| 2006/0020844 A1 | 1/2006 | Gibbons |
| 2006/0101192 A1 | 5/2006 | Zilavy |
| 2008/0184023 A1 | 7/2008 | Shih |

(Continued)

*Primary Examiner* — Chun Cao
(74) *Attorney, Agent, or Firm* — K&L Gates LLP (57) ABSTRACT

A system including a BIOS system comprising a first memory device configured to store data associated with a computer system is provided. The first memory device is a non-volatile random-access memory device. The system further includes a second non-volatile memory device configured to store a set of instructions for execution by a processor during initialization of the computer system. The set of instructions comprises at least one instruction configured to read a data value stored in the first memory device.

9 Claims, 10 Drawing Sheets

(56) References Cited

U.S. PATENT DOCUMENTS

| | | | |
|---|---|---|---|
| 2008/0288767 A1* | 11/2008 | Wang | G06F 11/1417 |
| | | | 713/2 |
| 2011/0119477 A1 | 5/2011 | Byun | |
| 2012/0272095 A1 | 10/2012 | Liu | |
| 2015/0242219 A1 | 8/2015 | Liu | |

* cited by examiner

MEMORY SYSTEM WITH SIMULATED MEMORY PROCESS

CROSS-REFERENCE TO RELATED APPLICATIONS

This application is a divisional of U.S. application Ser. No. 14/705,516, filed on May 6, 2015, the disclosure of which is hereby incorporated by reference in its entirety.

TECHNICAL FIELD

The present invention relates to computer system BIOS and in particular with to a BIOS system having simulated BIOS complementary metal-oxide-semiconductor (CMOS) RAM.

BACKGROUND

All computer systems include a non-volatile memory disposed on the motherboard containing a set of instructions to be executed by a CPU to initialize the start-up or "boot" process of the system. This non-volatile memory, and the instructions it stores, commonly referred to as the BIOS, is coupled to another memory device, commonly referred to as the CMOS, which stores configuration data that is read by the CPU, via BIOS instructions, to inform the boot process with respect to setup parameters of the system. For example, the configuration data stored in CMOS includes data with respect to attached peripherals such as a keyboard, mouse, display, and which drive or other storage device contains the operating system to boot. Additionally, CMOS includes a real-time clock (RTC) that maintains date and time information. Configuration data stored in the CMOS can be edited by a user, to accommodate a different system configuration, such as the drive order with respect to the operating system to boot. The CMOS memory is volatile, and a battery installed on the motherboard preserves the data stored in the CMOS when the computer system is powered down. When the CMOS battery eventually fails, the configuration data reverts to a set of default values, and any user-modified values are lost. Consequently, after replacing the battery, on boot of the system and early in the boot process, any configuration data that had previously been modified must be manually re-entered via the BIOS setup routine, for example. This represents a maintenance cost in a commercial or industrial information technology environment, and at least an inconvenience in a single-user environment. Thus, a BIOS system having a non-volatile memory device that can maintain the configuration data without the need for a backup battery while maintaining compatibility with off-the-shelf computer system architectures is advantageous.

BRIEF DESCRIPTION OF THE DRAWINGS

For a detailed description of exemplary embodiments of the invention, reference will now be made to the accompanying drawings in which:

FIG. 3, consisting of five parts.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Memory image" means the set of data values stored in a memory device, including any transitory copy thereof.

"Non-volatile" memory as used in conjunction with a memory device means a memory device in which the stored contents are preserved if electrical power to the memory device is removed.

"Exemplary means "serving as an example, instance, or illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
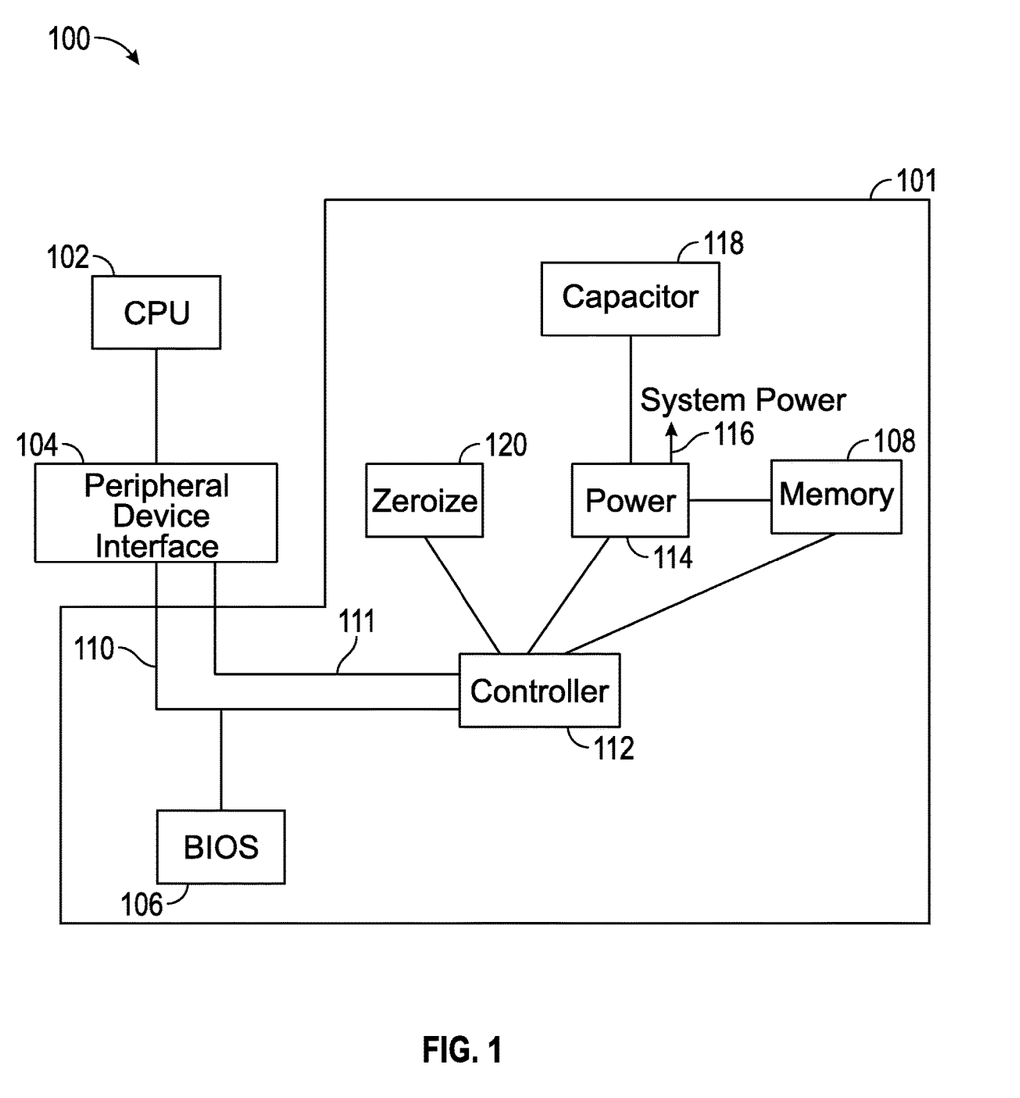
FIG. 1 shows a high-level block diagram of a computer system in accordance with at least some embodiments.

Refer now to FIG. 1 illustrating a block diagram of a computer system 100 in accordance with at least some embodiments. Computer system 100 includes central processing unit (CPU) 102. Peripheral devices, such as mass storage devices and the like (not shown in FIG. 1) may be coupled to CPU 102 via a peripheral device interface 104 which, in some embodiments, may be a southbridge, or, in other embodiments, may be a platform controller hub (PCH), or I/O controller hub (ICH), depending on the architecture of CPU 102. For example, in embodiments of CPU 102 having an on-die or in package, i.e. integrated, memory controller, a PCH coupled to the integrated memory controller may be used. In embodiments of a CPU 102 without an integrated memory controller, a southbridge may be used and coupled to CPU 102 via a northbridge (not shown in FIG. 1). The principles of the embodiments described herein are not dependent on the particular architecture or type of peripheral device interface, whether southbridge, PCH, ICH or otherwise. Peripheral device interface 104 may couple to various input/output (I/O) devices, such as mechanical hard drives, solid-state drives, keyboards, pointing devices, USB ports, and the like (not shown in FIG. 1). Further, peripheral device interface 104 may couple to onboard non-volatile memory devices containing firmware instructions executed during the process of start-up, or booting, computer system 100.

In the exemplary embodiment of computer system 100, onboard memory devices may include a BIOS 106, and a memory device 108. Memory device 108 may be an electrically programmable memory such as a flash memory, but any suitable re-writable, non-volatile, random access memory architecture may be used. In accordance with conventional practice, BIOS 106 may refer to a set of instructions (sometimes referred to as "firmware") read and executed by the CPU during initialization of the system, along with a RAM device storing those instructions. Further, BIOS shall be used herein to mean such firmware whether the architecture is based on legacy Basic Input/Output System (BIOS), the Unified Extensible Firmware Interface (UEFI) specification promulgated by the UEFI Forum, Beaverton, Oreg., Open Firmware as promulgated by Open Firmware Working Group, or otherwise. BIOS 106 may be coupled to peripheral device interface 104 via a bus, bus 110, which may be a Low Pin Count (LPC) bus. Other exemplary embodiments may include an A-link bus used on Advanced Micro Devices (AMD) based platforms. The principles of the disclosed example embodiments are not dependent on a particular bus architecture.

During boot, firmware instructions stored within BIOS 106 may be read by, and communicated to, CPU 102, via peripheral device interface 104, for execution as part of the boot process. Further, memory device 108 may contain configuration data with respect to computer system 100 which data may be consumed by the firmware instructions during the boot process, similar to configuration data stored in the legacy CMOS previously described. Likewise, memory device 108 may store an RTC time value which may be used during startup of system 100, as described further below. Memory device 108 may be coupled to bus 110 via controller 112. Reads from and writes to memory device 108 may be effected via controller 112, also described further below. Controller 112 may also be coupled to peripheral device interface 104 by a second bus, bus 111, described in further detail below in conjunction with FIG. 2. In at least some embodiments, controller 112 may be implemented in a field-programmable gate array (FPGA). In at least some other embodiments, controller 112 may comprise an application-specific integrated circuit (ASIC). In still other embodiments, controller 112 may be an embedded microcontroller and integrated firmware implementing the functionality of controller 112.

Controller 112 may receive electrical power via power module 114, which interfaces controller 112, memory device 108 with system power bus 116. A capacitor 118 may also be provided and coupled to power module 114 to maintain power to controller 112 and memory device 108 should system power be lost during the pendency of an memory transaction, such as a memory write or RTC update to a memory device 108. Stated otherwise, capacitor 118 allows for the cleanup of pending operations to a memory device 108 should power be turned off or otherwise interrupted. Power module 114 detects when electrical power on system power bus 116 is lost or otherwise interrupted and switches to electrical energy stored in capacitor 118, thereby drawing power from capacitor 118. Power module 114 may also charge capacitor 118 on start-up of system 100. Although power module is shown separately from controller 112, in at least some embodiments, it may be integrated within controller 112.

Zeroize module 120 may be provided to clear or reset the RTC and memory device 108. Zeroize module 120 may include a user interface and logic to receive a user-initiated command to reset the memory and/or RTC. Such a user command may be entered during execution of BIOS instructions during start-up of the system. As will be described in further detail below, a BIOS system 101 comprising BIOS 106, memory device 108, controller 112, power module 114, capacitor 118 and zeroize module 120 may functionally mimic a legacy BIOS and CMOS.

Figure 2:
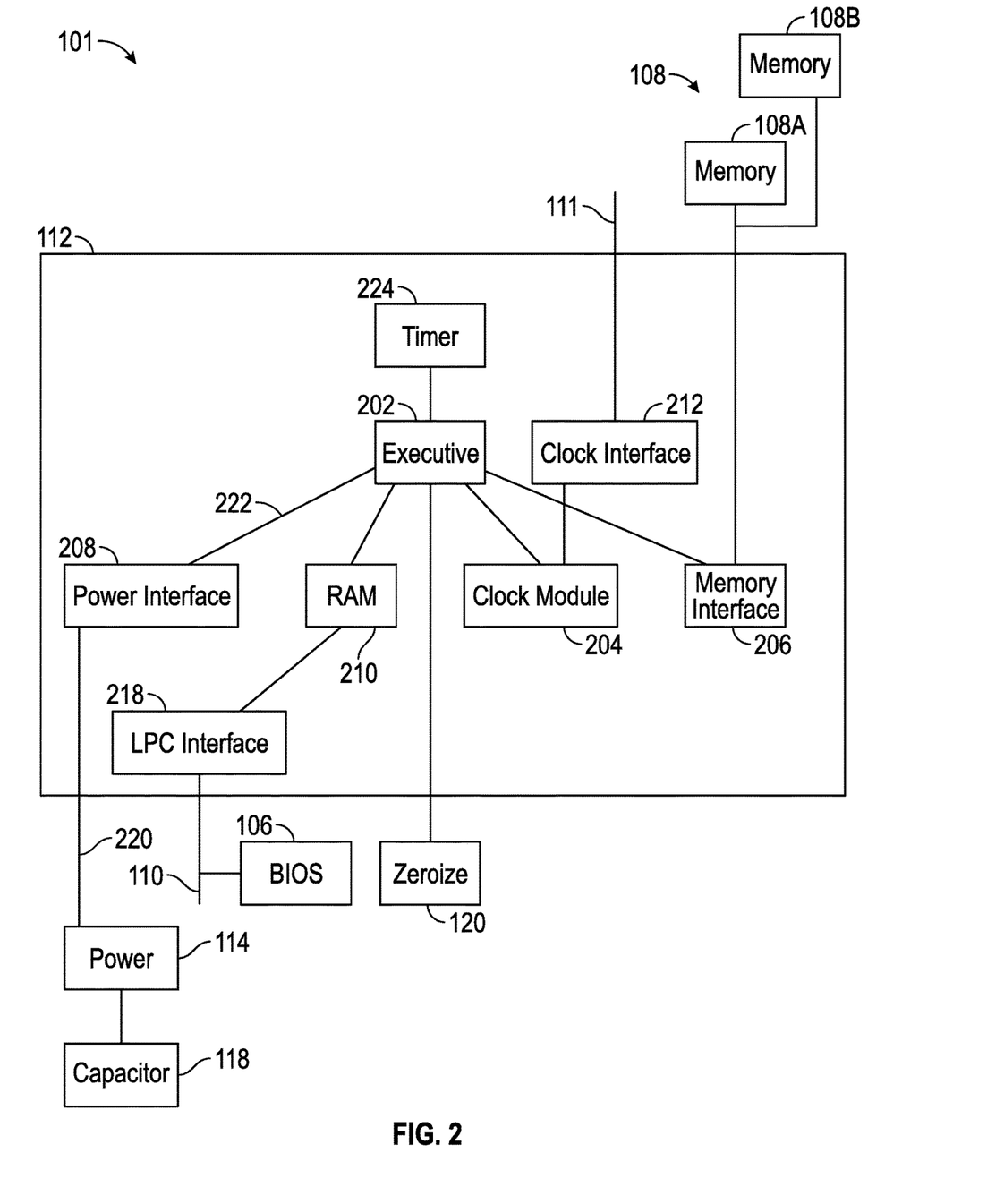
FIG. 2 shows a block diagram of a portion of the computer system of FIG. 1 in accordance with at least some embodiments.
Figure 3A:
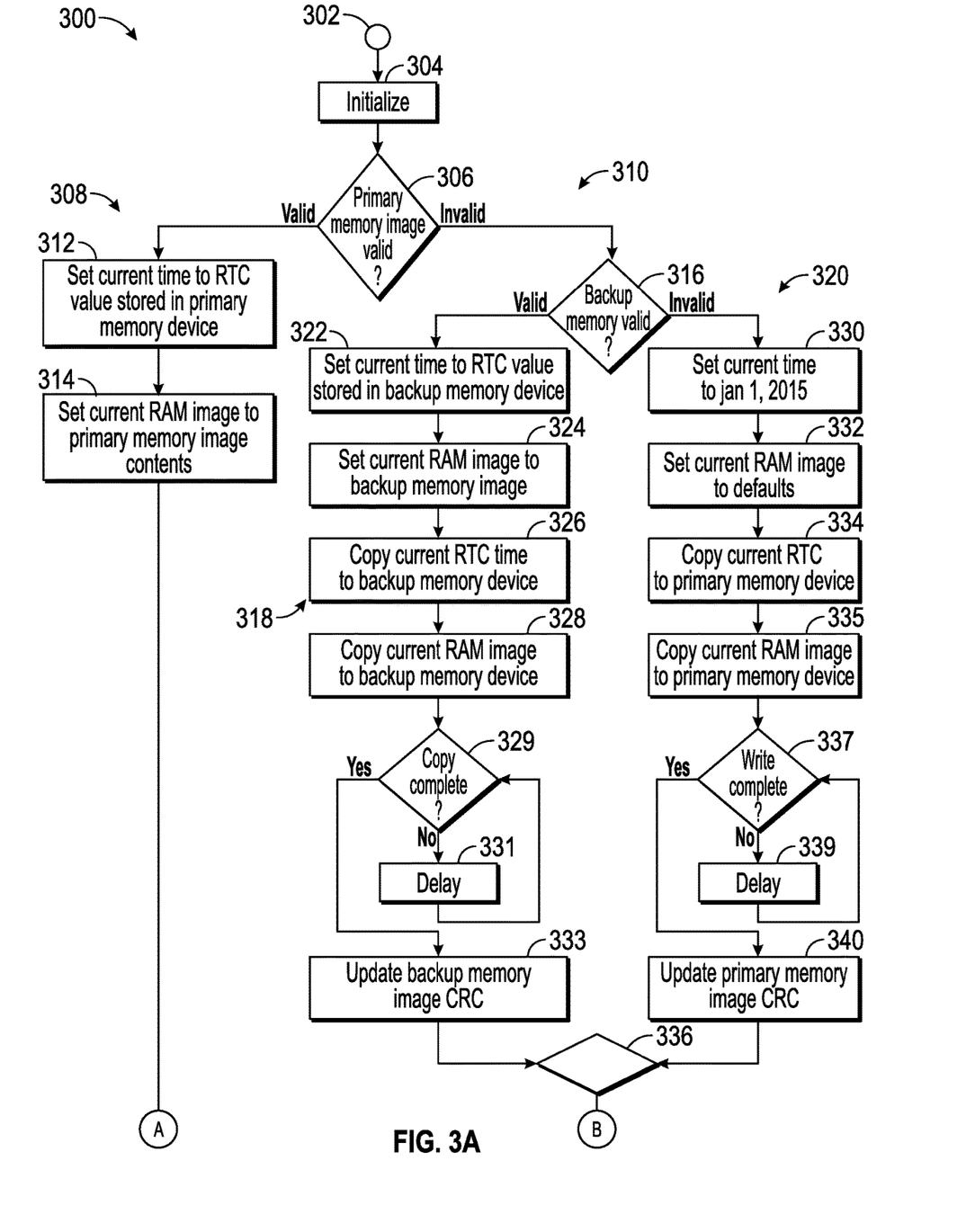
FIGS. 3A, 3B, 3C, 3D and 3E, shows an activity diagram of a portion of the computer system in accordance with at least some embodiments.
Figure 3B:
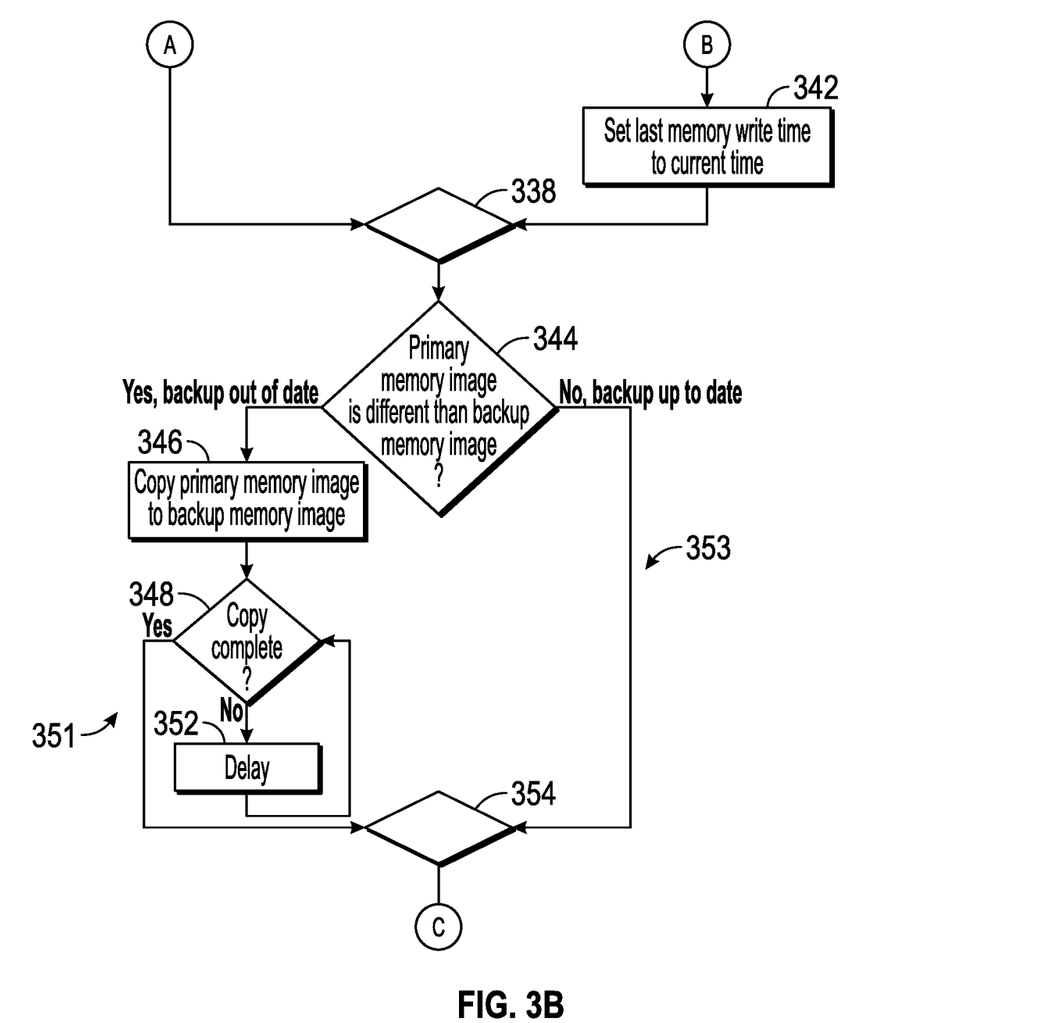
Figure 3C:
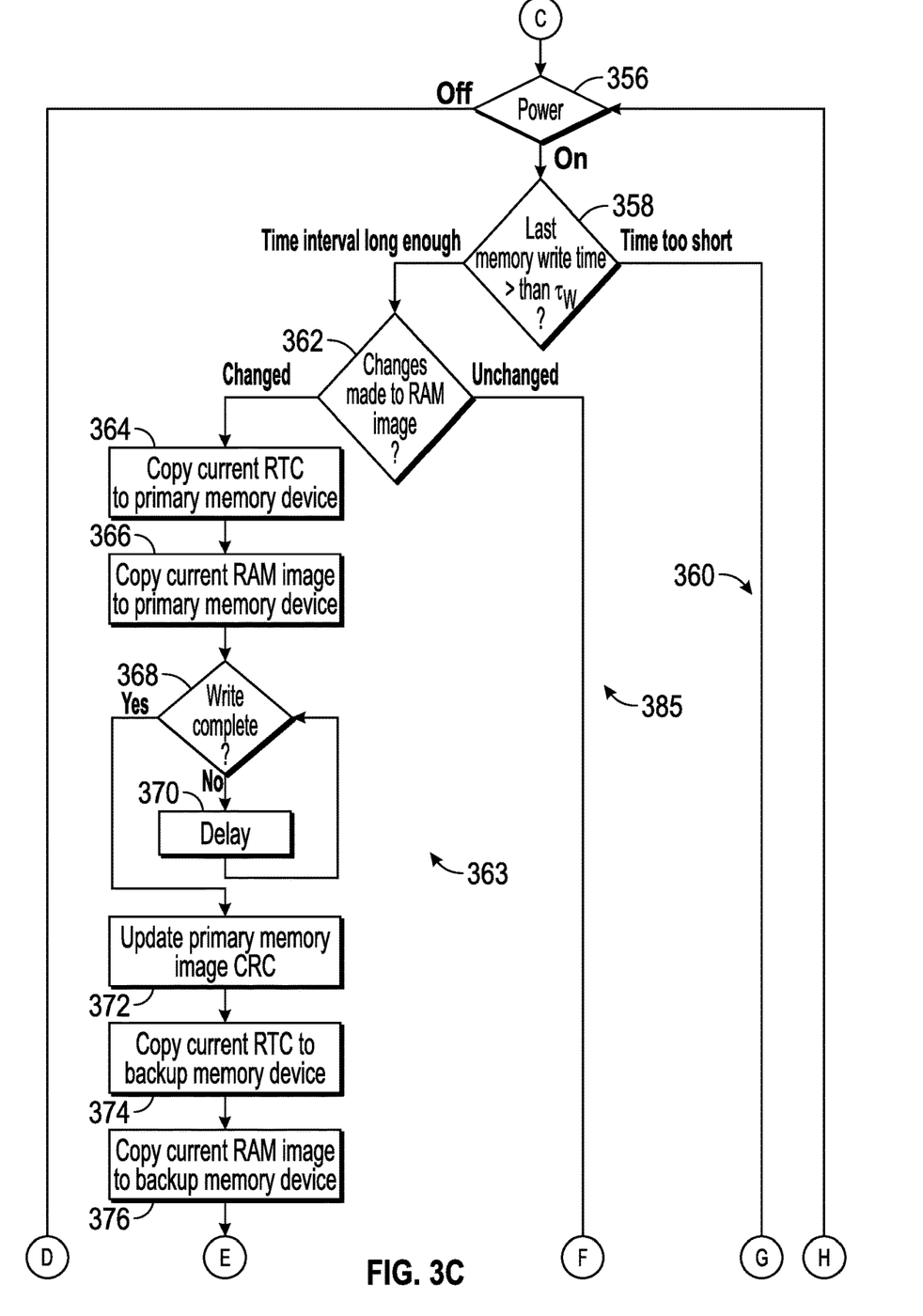
Figure 3D:
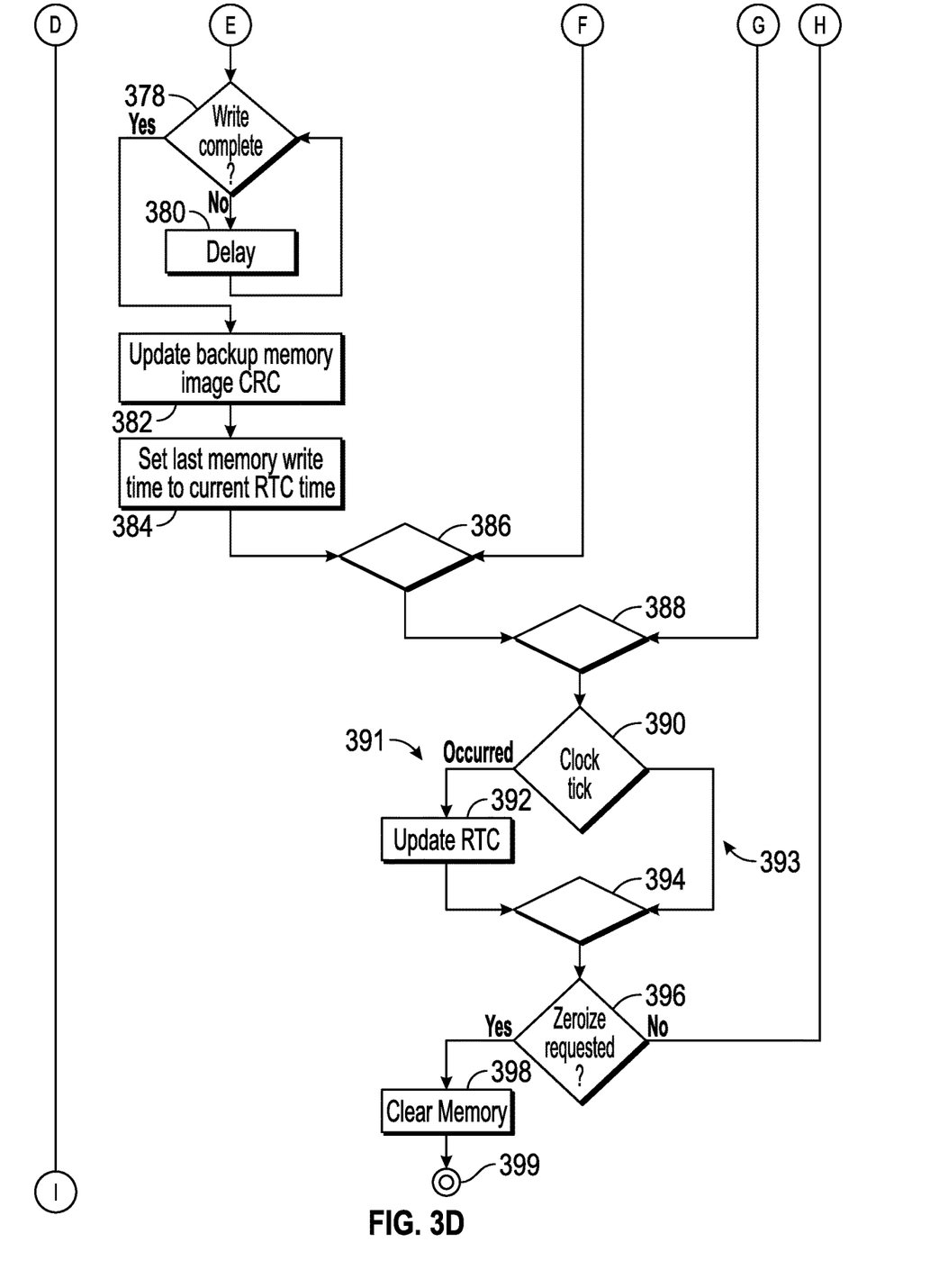
Figure 3E:
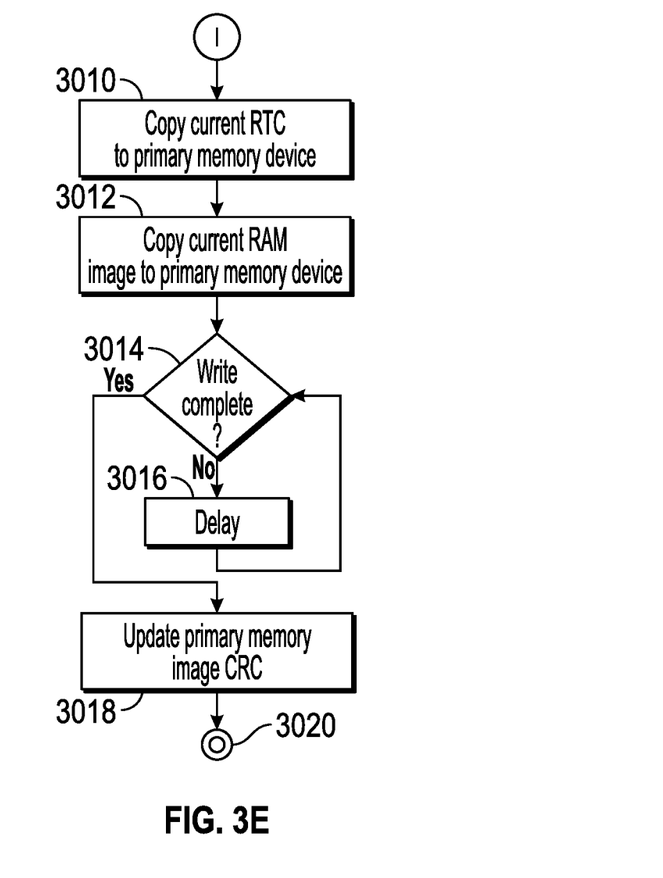

Turning now to FIG. 2, there is shown, in further detail, an architectural block diagram of BIOS system 101 in accordance with an exemplary embodiment of the principles disclosed herein. Controller 112 includes an executive 202 that comprises logic that performs the activities described below in conjunction with FIG. 3. Executive 202 is coupled to a clock module 204, a memory interface 206, and a random access memory (RAM) 210. RAM 210 may be a dual-port memory and may be volatile. In the illustrative embodiment of controller 112, RAM 210 is shown integrated with controller 112. However, RAM 210 may, alternatively be a separate device coupled to the controller. RAM 210 may be used to mirror the data in memory device 108, as described further below, and may be volatile memory in that data held therein may be lost when the system shuts down or system power is otherwise interrupted. A power interface 208 may signal executive 202 that the system power has been interrupted. Recall that power module 114 may detect a power off condition and switches to the electrical energy stored in capacitor 118, to allow an orderly shutdown of BIOS system 101. For example, a power connection 220 between power module 114 and power interface 208 may include multiple conductors, wherein power module 114 switches between the conductors depending on the source, either system power bus 116 or capacitor 118. Power interface 208 may then detect the powered connection, and assert, or de-assert a signal line in link 222 between executive 202 and power interface 208. Executive 202 may then recognize a power off state of the system power bus, and effect an orderly shutdown of BIOS system 101, ad described further below. The foregoing example is but one technique for initiating such an orderly shutdown, and any suitable technique to signal executive 202 may be used. Power interface 208 may also condition electrical power from power module 116 to adjust voltage and/or current levels based on the requirements of executive 202 and other components within controller 112 and the voltage and current supplied by power module 114, as necessary.

Clock module 204 maintains the RTC. The RTC may be initialized, and set by executive 202 as described further below in conjunction with FIG. 3. Clock interface 212 couples clock module 204 to bus 111. Bus 111 may, in at least some embodiments be a serial peripheral interface (SPI) bus. In other embodiments, bus 214 may be an inter-integrated circuit (I²C) bus. Clock interface 212 provides electrical signals comprising RTC time data in accordance with the corresponding bus protocol.

Memory interface 206 couples executive 202 to memory device 108. Memory device 108 may be divided into two portions, memory device 108A and memory device 108B. In at least some embodiments, one memory device 108A, say may be used as a primary memory and memory device 108B as a backup memory. Memory devices 108A, 108B may be implemented as two separate physical memory devices, or, alternatively, as separate logical partitions of a single physical memory device. Memory interface 206 may include a memory controller appropriate to the particular architecture of memory devices 108A, 108B. For example, if memory devices 108A, 108B are implemented with flash memory devices, memory interface 206 may include a flash memory controller to mediate read and write transactions between executive 202 and memory devices 108A, 108B. Such a flash memory controller my also map any bad memory cells in memory devices 108A, 108B and create a directory structure to create a mapping between logical addresses and physical locations on the flash memory die. In other embodiments, a memory controller may be integrated within memory devices 108A, 108B and memory interface 206 may provide a communication link between executive 202 and the integrated memory controller. For example, in such an embodiment employing NAND flash memory, memory interface 212 may include a JEDEC standard HS-MMC interface. However, memory interface 212 may include any suitable communication interface appropriate to architecture of memory devices 108.

Controller 112 may also include a bus interface such as an LPC interface 218. LPC interface 218 couples RAM 210 to LPC bus 110, and communicates read and write transactions between peripheral device interface 104 and RAM 210. Memory transactions (i.e. a read or write) in non-volatile memory devices, such as a memory device 108, may be slow relative to other bus transactions between peripheral device interface 104 and other peripheral devices on LPC bus 110. In at least some embodiments in which a memory device 108 comprises a non-volatile memory with a slow write cycle, RAM 210 may intermediate the memory transaction directed to memory device 108. LPC interface 110 couples to RAM 210 to communicate memory transactions that ultimately are directed to a memory device 108. As previously described, RAM 210 may comprise a dual port memory device. Memory transactions to or from peripheral device interface 104 may be effected via a first port of such a dual-port RAM 210 coupled to LPC interface 110. Executive 202 may also conduct memory transactions with RAM 210 via a second port on a dual-port RAM 210. Stated otherwise, RAM 210, in conjunction with executive 202 may, under the control of executive 202, "buffer" memory transactions between peripheral device interface 104 and memory devices 108 comprising slow, non-volatile memory, as described further below in conjunction with FIG. 3.

Controller 112 may also include a timer 224 coupled to executive 202. Timer 224 may act as a "stopwatch" to track a time interval between writes to memory 108, also described further in conjunction with FIG. 3.

Referring now to FIG. 3, FIG. 3 shows a Unified Modeling Language (UML) activity diagram for a process 300 for mimicking legacy CMOS RTC and memory transactions in accordance with an embodiment of the disclosure. Process 300 may comprise operations performed by executive 202. Further, at least some of the actions shown in serial fashion in the UML activity diagram of process 300 may be performed in parallel. Process 300 starts at 302 and, at block 304 initializes the various components of controller 112 in conjunction with the initialization other hardware in system 100 upon startup of the system. At block 306, it is determined if the memory image in a memory device 108 designated as the primary memory, memory device 108A, for example, is valid. Testing validity may use, a checksum, for example, a cyclic redundancy check (CRC) value which may be appended to the data stored in a memory device, such as a memory device 108. At block 306, the CRC for the stored data may be calculated and compared to the stored CRC value. If there is a mismatch in the two CRC values, then the stored data may have been corrupted and thus deemed invalid. Conversely, if the CRC values are the same, the data may be deemed valid. Although block 306 is described in terms of a CRC, any suitable checksum or other error detection scheme may be used to test the validity of the stored set of data values. If the image in the primary memory device, comprising a current set of data values in the primary memory device, is valid, process 300 proceeds along path 308 via the "valid" branch of block 306. If the memory image in the primary memory device is invalid, process 300 proceeds by the "invalid" branch of block 306 along path 310.

Considering first path 308, in block 312, a current time is set to the RTC time value stored in the primary memory device, say memory device 108A, and a current memory image in RAM memory device 210 is set to the memory image in the primary memory device, at block 314. Stated otherwise, the RTC time value stored in the primary memory device is copied to RAM 210 and the memory image stored in the primary memory device is copied to RAM 210.

Turning now to path 310, if the primary memory image is invalid, it is determined if a backup memory image, comprising a current set of data values stored in the backup memory device, say memory device 108B, is valid, block 316. The same error detection scheme used at block 306 may also be used at block 316. If the backup memory image is valid, process 300 proceeds via the "valid" branch of block 316 along path 318. Otherwise, process 300 proceeds along path 320 via the "invalid" branch of block 316.

Considering first path 318, a current time is set to the RTC time value stored in the backup memory device and the current memory image in RAM 210 is set to the backup memory image stored in the backup memory device, at blocks 322 and 324, respectively. In block 326, the current RTC time is copied to the backup memory device and the current RAM memory image is copied to the backup memory device, block 328. To account for a write cycle time in the backup memory device, process 300 enters a delay loop at block 329. If the copy is not complete, block 329, process 300 delays at block 331, and returns to block 329. Upon completion of the copy to the backup memory device, process 300 breaks out of the loop via the "Yes" branch of block 329. In block 331, a time delay may be selected based on a write/program cycle time specified by the vendor of the memory device. Alternatively, as described in conjunction with FIG. 4 below, memory devices 108 may signal completion of a write cycle by setting or clearing a flag or pin, which clearing/setting may be used at block 329 to detect that the copy is complete, and a delay may be based on a time for the pin or flag to settle in accordance with the specifications of the memory device. Upon exiting the loop at blocks 329, 331, in block 333, the CRC, or similar error detection value, for the memory image in the backup memory device is updated.

Turning now to path 320, if the backup image is invalid, in block 330 the current time is set to a default time, such as 0000Z (Greenwich Mean Time, or GMT) Jan. 1, 2015. The foregoing is one example of a default time, and any suitable value may be used. Similarly, the current memory image in RAM 210 is set to a preselected default, block 332. In block 334, the current RTC time value is copied to the primary memory device, e.g. memory device 108A. The current memory image in RAM 210 is copied to the primary memory device at block 335. Similar to path 318, process 300 enters a delay loop at block 337, looping through a delay 339 until the write to the primary memory device completes. The CRC, or other error detection value for the memory image in the primary memory device is updated at block 340. Paths 318 and paths 320 merge at block 336, and, in block 342, a time of the last write to a memory device 108 is set to the current RTC time. Paths 308 and 310 merge at block 338.

Process 300 may synchronize the memory images in the primary and backup memory devices, at blocks 344-354. In block 344, it is determined if the memory images in the primary and backup memory devices are different. If so, process 300 proceeds along path 351 to block 346 and the primary memory device image is copied to the backup memory device. Process 300 enters a delay loop at block 348, looping through a delay at block 352 until the write to the backup memory device completes. Returning to block 344, if the images are the same, the copy to the backup memory device is bypassed via path 353. Paths 351 and 353 merge at block 354.

Process 300 enters a loop at block 356 at which the power state of the system is monitored. As described above, power interface 208 may signal executive 202 if the system power is interrupted. If the system power is on, block 356 proceeds to block 358. Otherwise, if a power interruption is detected, block 356 proceeds by the "off" branch to block 3010 as described further below.

At block 358, it is determined if the time interval after the last write to a memory device 108 has exceeded a time interval, $\tau_w$. An example time interval $\tau_w$ might be 15 seconds, but any suitable interval may be used. Timer 224 may be used to track the elapsed time between writes to a memory device 108. For example, at the expiry of the time interval, timer 224 may set a flag that is detected at block 358. In at least some embodiments of BIOS system 101 in accordance with the disclosed principles, timer 224 may be user programmable through, say a BIOS setup routine. If the time interval does not exceed $\tau_w$, process 300 proceeds via path 360 to block 390 described further below. Otherwise, process 300 proceeds to block 362.

In block 362, it is determined if a change has been made to one or more of the data values comprising the memory image in RAM 210. Recall that RAM 210 may intermediate, or buffer, memory transactions between the CPU 102 and BIOS system 101. Thus, RAM 210 may be the target of a write instruction executed by CPU 102 intended to change one or more of the data values stored in memory device 108, as described further below in conjunction with FIG. 4. If a value is changed via such a write instruction, for example, RAM 210 may detect the difference in the new value and the mirrored value and signal executive 202. In response to detecting the changed value, block 362 proceeds by the "changed" branch along path 363 to block 364. At block 364, the current RTC time is copied to the primary memory device, and at block 366 the current memory image in RAM 210 is copied to the primary memory device. The current memory image may comprise the set of data in RAM 210 including the new value or values of any members of the set that have been changed, and the unchanged values of members that remain unchanged. Process 300 enters a delay loop at block 368, looping through a delay block 370 until the write to the primary memory device completes. At block 372, the primary memory device memory image CRC, or similar error detection value, is updated. The current RTC time is copied to the backup memory device at block 374, and the current RAM memory image is copied to the backup memory device, at block 376. Again process 300 waits, via the delay loop at blocks 378 and 380 until the write to the backup memory device completes. The backup memory device memory image CRC, or similar error detection value, is updated at block 382, and the last memory device write time is set to the current RTC time at block 384.

Returning to block 362, if no data values in the RAM 210 memory image have changed, block 362 proceeds via the "unchanged" branch along path 385 to merge at block 386 with path 363. Returning to block 358, if the time interval does not exceed $\tau_w$, process 300 proceeds to block 390 via path 360 which merges with merged paths 363 and 385 at block 388.

In block 390, it is determined if a predetermined clock "tick" has occurred. For example, a clock tick of one second may be used in at least some embodiments of process 300. However, any suitable time interval may be used to represent a clock tick. If a clock tick has occurred, process 300 proceeds via path 391 to update the RTC, at block 392. Otherwise, if a clock tick has not occurred at block 390, process 300 falls through path 393 to merge with path 391 at block 394 and proceeds to block 396.

In block 396, it is determined if a zeroize request has been received. A zeroize request may be generated via zeorize module 120 in response to user input, which may for example, be received during execution of a BIOS setup routine in the BIOS firmware. If a zeroize request is received, the memory devices are reset or cleared at block 398, and process 300 reaches end state 399 and terminates.

Otherwise, if a zeroize request has not been received at block 396, process 300 returns to block 356 where process 300 loops through paths 363, 385 or 366 as described, until a system power interruption is detected. If a system power interruption is detected, block 356 proceeds by the "off" branch to block 3010. Recall that controller 112 may be powered after an interruption of the system power using the energy stored in capacitor 118.

In blocks 3010-3018, process 300 updates the memory image of the primary memory device to address any writes to the BIOS system that might have occurred between write interval $\tau_w$ and the power interruption. At block 3010, the current RTC time is copied to the primary memory device, for example memory device 108A. The current RAM 210 memory image is copied to the primary memory device, at block 3012. Process 300 waits, via the delay loop at blocks 3014 and 3016 until the write to the primary memory device completes. The primary memory device memory image CRC, or similar error detection value, is updated at block 3018. Process 300 terminates at end state 3020.

Figure 4:
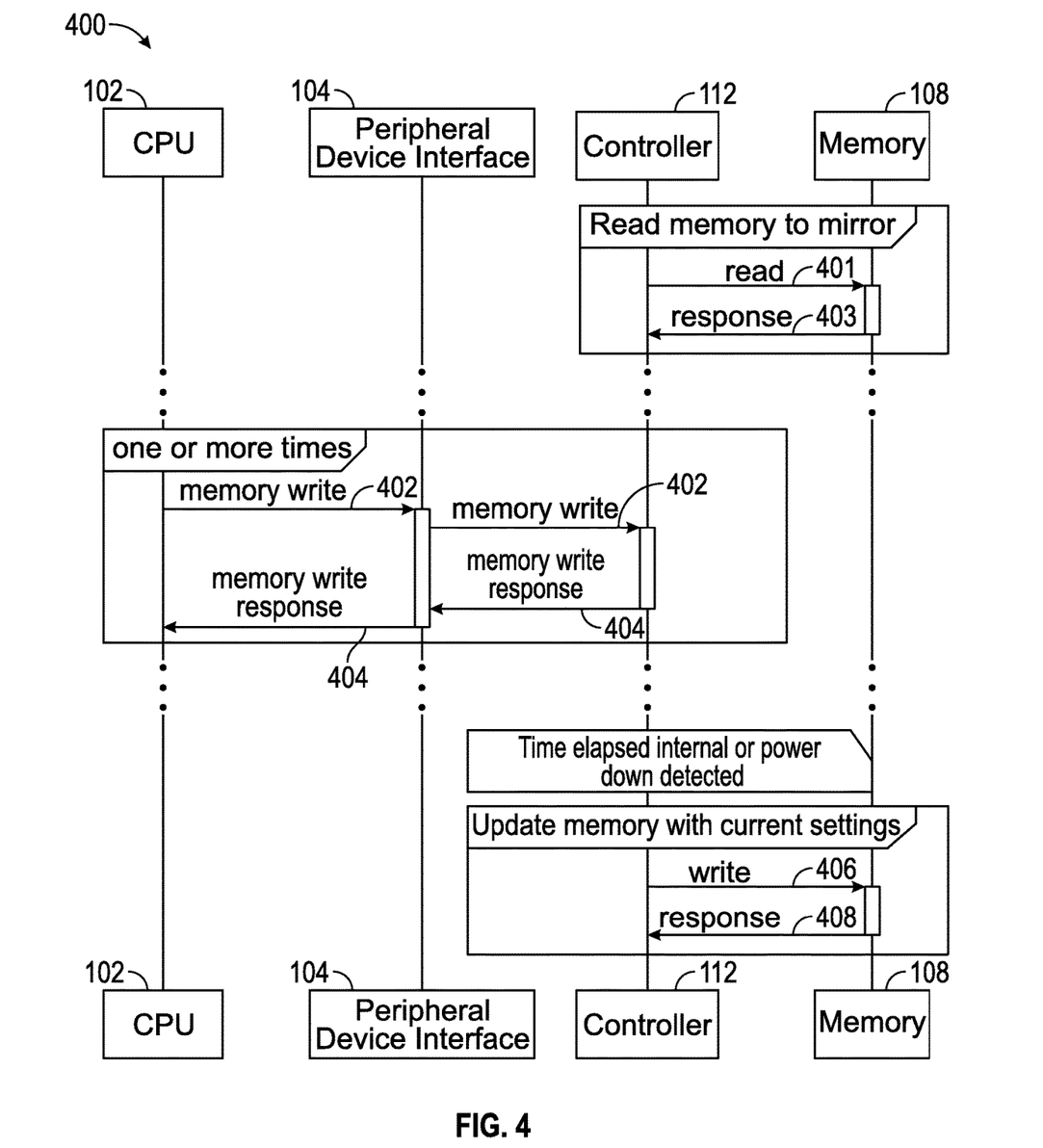
FIG. 4 shows a ladder diagram of a memory write operation in accordance with at least some embodiments.

Referring now to FIG. 4, there is shown a UML ladder diagram, for write operations 400, in accordance with at least some embodiments, to a BIOS system such as exemplary BIOS system 101. A sequence of actions comprising write operations 400 may be depicted from top to bottom in FIG. 4. To mitigate memory access latencies that may be associated with sow non-volatile memory devices, the memory image in a memory device 108 may be mirrored in RAM 210. Thus, controller 112 may issue a read 401 to a memory device 108 which returns a response 403 comprising a copy of the data stored therein. Controller 112 may then load that data in RAM 210 to initialize the mirror of the memory image. A write to memory may be effected by the execution by CPU 102 of an instruction in BIOS firmware to update data otherwise stored in CMOS in a conventional, legacy CMOS. Thus, CPU 102 issues one or more memory writes 402 addressed to BIOS system 101. For example, CPU 108 may execute an out instruction to I/O port 0x70 with the register address corresponding to the target legacy CMOS register containing a value to be updated. The value to be updated in memory device 108 may then be sent to BIOS system 101 by the CPU 102 executing, for example, an out instruction to I/O port 0x71 with the updated value as an instruction operand. The memory write 402 is sent to peripheral device interface 104 which forwards write 402 to controller 112 in accordance with the particular bus protocol appropriate to the link between peripheral device interface 104 and controller 112, LPC 110 in the exemplary embodiment of system 100. The updated value in the payload of memory write 402 may be stored in RAM 210 mirroring the data in memory device 108, as described above. Such a write to RAM 210 may trigger test as described in conjunction with block 362, FIG. 3. Controller 112 may then send a memory write response to peripheral device interface 104 for forwarding to CPU 102. The response 404 is an acknowledgement that the write command was accepted. The content of the write response may depend on the particular bus protocol. For example, for an LPC 110, the controller may send a ready response or an error response. As described above in conjunction with FIG. 3, the memory image stored in memory devices 108 may be updated at time intervals, $\tau_w$, or if an interruption in system power is detected. Either of these may cause controller 112 to emit a write 406 to a memory device 108 updating the data stored therein. Memory device 108 may also return a response 408 to controller 112. For example, the storing of a data value may take a finite time before the write cycle completes. Thus, memory device 108 may set or clear a flag pin or bit when the write, or program, cycle completes thereby signaling controller 112 that it is safe to proceed to its next action.

Figure 5:
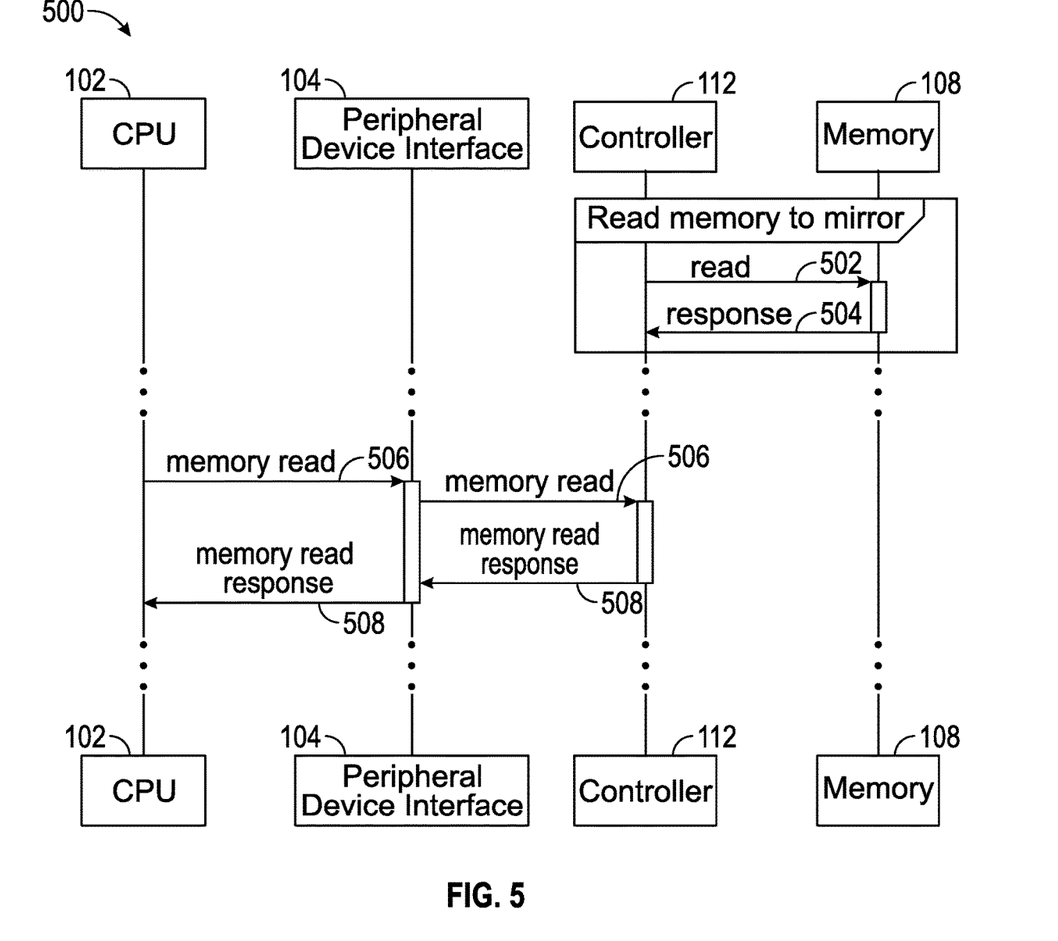
FIG. 5 shows a ladder diagram of memory read operation in accordance with at least some embodiments.

Turn now to FIG. 5 which shows a UML ladder diagram of read operations 500, in accordance with at least some embodiments, to retrieve data stored in a memory device 108. As previously described, to speed up access to the data stored in a non-volatile memory device, controller 112 may mirror the data in RAM 210. Thus, controller 112 may issue read request 502 to memory device 108 which may be either a primary memory device, e.g. memory device 108A, or a backup memory device, e.g. memory device 108B, depending on the state of validity of the data, as described in conjunction with blocks 306 and 310, FIG. 3. Memory devices 108 return the data in response 504. Thereafter, CPU 102 may execute instructions, for example instructions included in BIOS firmware, to read one or more data values from BIOS system 101. For example CPU 102 may send the address of the register to be read via an out instruction to I/O port 0x70, and then execute an in instruction to port 0x71, whereby memory read 506 is sent to peripheral device interface 104. Peripheral device interface 104 forwards memory read 506 to controller 112. Controller 112 returns, in read response 508, the requested data value via the mirrored value in RAM 210. Peripheral device interface 104 forwards the data to CPU 102.

Figure 6:
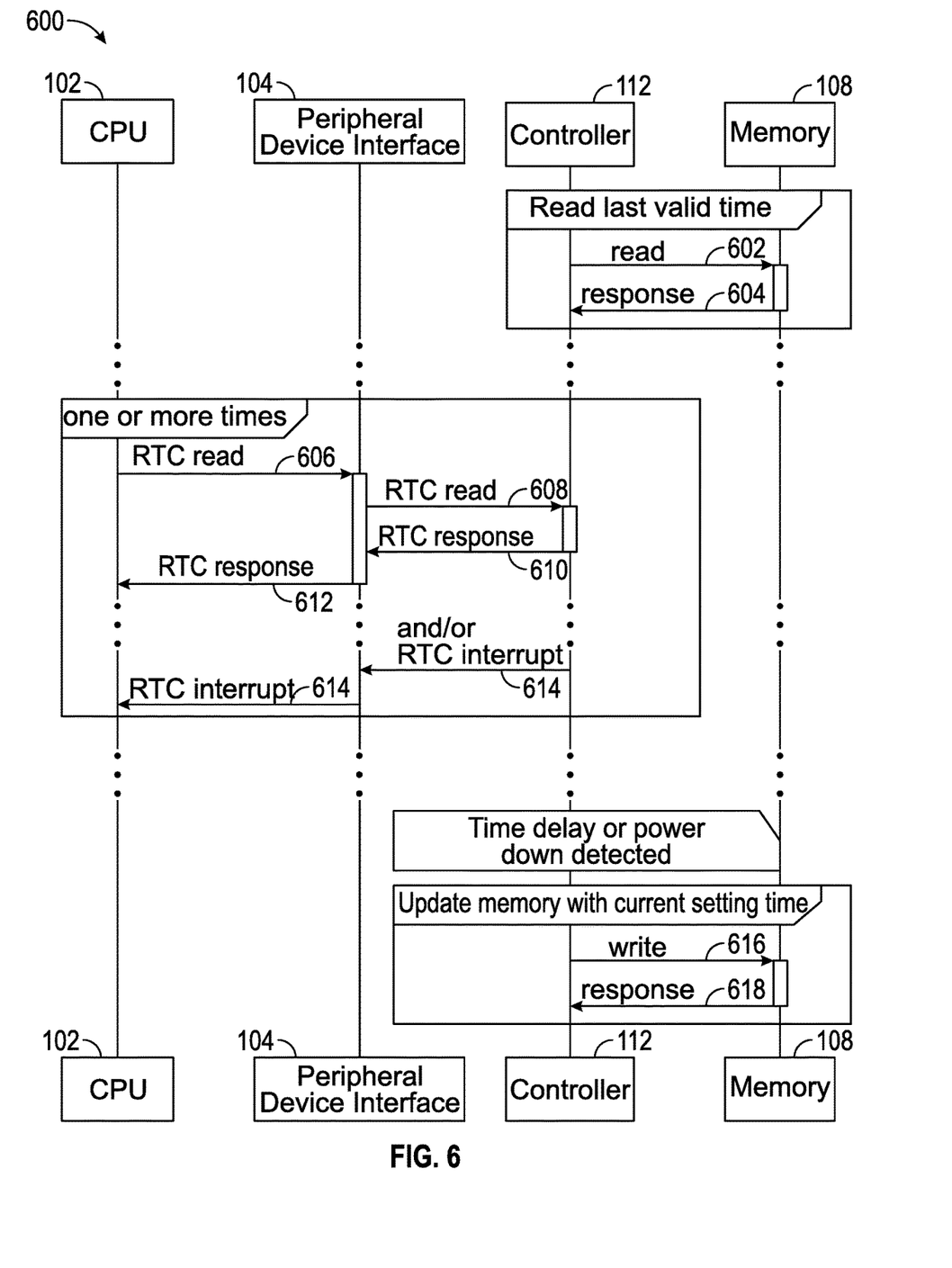
FIG. 6 shows a ladder diagram of a real time clock operation in accordance with at least some embodiments.

FIG. 6 shows a UML ladder diagram of RTC operations 600 in accordance with at least some embodiments. RTC transactions between controller 112 and CPU 102, as intermediated by peripheral device interface 104, may be communicated between peripheral device interface 104 and controller 112 on bus 111. As described in conjunction with FIG. 3, an RTC time value may be written to memory 108 on a system power shutdown or other interruption. As described above, the stored RTC time value may be used during startup to set the system time. Thus, controller 112 may issue a read 602 to a memory device 108 to obtain a last valid RTC time value stored therein. Response 604 returns the stored RTC time value to controller 112, which may mirror the value in RAM 210 and initialize clock module 204. In this way, if an RTC read is issued by CPU 102 upon power up of the system, for example, a time value may be returned, even if that value is inaccurate. In this way, even though the time may be inaccurate, the RTC will not go backwards. Some operating systems may be sensitive to a non-monotonically increasing RTC which can result in system errors on such systems. During operation of the system, CPU 102 may execute instructions to read an RTC time value from BIOS system 101. For example, the components of an RTC time value, comprising an hour, minute, second may be represented as binary coded decimal (BCD) values that are stored in registers in RAM 210. In other embodiments, the RTC time values may be stored in a binary representation in the RAM 210 registers. The registers in RAM 210 may be logically mapped to legacy CMOS registers. Thus, CPU 102 may read the hour value, say by executing an out instruction to I/O port 0x70 with a operand value of 0x04 to select the designated legacy CMOS register storing the RTC hour value, and then execute an in instruction to port 0x71, to read the RTC hour, wherein RTC read 606 is forwarded to peripheral device interface 104. Peripheral device interface 104 issues an RTC read 608 targeting the logically mapped physical register in RAM 210 that mirrors the RTC hour value. Peripheral device interface 104 may remap the logical register value received in the payload of the out instruction to I/O port 0x70 to the physical memory register in RAM 210. Similarly CPU 102 may issue an RTC read 606 targeting the legacy CMOS registers storing the minute and second RTC time values, as well as the day, month, year, and the like. Thus, multiple RTC read 606 and RTC read 608 requests may be issued in reading the RTC time. The RTC time component stored in the target register is communicated by controller 112 to peripheral device interface 104, RTC response 610, and communicated thereby to CPU 102, RTC response 612.

Further, controller 112 may issue one or more RTC interrupts, emulating legacy CMOS RTC. Legacy CMOS RTC provides for several user-enabled interrupts: (1) a periodic interrupt; (2) an update ended interrupt; and (3) an alarm interrupt. To mimic legacy CMOS RTC, at least some embodiments of BIOS system 101, in accordance with the disclosed principles, may issue one or more user-enabled interrupts to CPU 102. Thus, controller 112 may send RTC interrupts 614 to CPU 102 via peripheral device interface 104.

As described above in conjunction with FIGS. 3 and 4, the memory image stored in memory devices 108 may be updated at time intervals, $T_w$, or if an interruption in system power is detected. Either of these may cause controller 112 to emit a write 616 to memory device 108 updating the data stored therein. Memory device 108 may also return a response 618 to controller 112. For example, the storing of a data value may take a finite time before the write cycle completes. Thus, memory device 108 may set or clear a flag pin or bit when the write, or program, cycle completes signaling controller 112 that it is safe to proceed to its next action.

The above discussion is meant to be illustrative of the various embodiments of the present invention and the principles thereof. Numerous variations and modifications will become apparent to those skilled in the art once the above disclosure is fully appreciated. For example, various time delays have been described, and exemplary values may have been included for illustrative purposes. It is intended that the following claims be interpreted to embrace all such variations and modifications.

What is claimed is:

1. A process comprising:
copying a first time value stored in a first memory device to a second memory device distinct from the first memory device, wherein the first memory device comprises a non-volatile memory device;
copying a first set of data values stored in the first memory device to the second memory device;
setting the first time value in the first memory device to a second time value from a real time clock when a first value of the first set of data values is changed to a second value;
copying a current set of data values in the second memory device to the first memory device, wherein the current set of data values in the second memory device comprises at least the second value and unchanged values of the first set of data values;
determining when a predetermined time interval has elapsed since a last write to the first memory device; and
writing the current set of data values to the first memory device when the predetermined time interval has elapsed.

2. The process of claim 1, further comprising:
determining when the first value of the first set of data values is changed to the second value; and
signaling the change by the second memory device in response to determining the first value is changed to the second value.

3. The process of claim 1, wherein the second memory device comprises a volatile dual port memory device.

4. The process of claim 1, further comprising copying the current set of data values and a current time clock value to a third memory device, wherein the third memory device comprises a non-volatile memory device.

5. The process of claim 4, further comprising:
determining whether the first set of data values in the first memory device is valid; and
copying, responsive to the determining, a third set of data values from the third memory device to the second memory device when the first set of data values in the first memory device is invalid, wherein the third set of data values comprises a valid backup image of the first set of data values, the valid backup image including the first value of the first set of data values.

6. The process of claim 5, further comprising:
determining whether the third set of data values in the third memory device is invalid; and
initializing a set of default data values in the second memory device in response to the current set of data values in the third memory device being invalid, wherein the third set of data values are not copied to the third memory device.

7. The process of claim 1, further comprising changing the first value to the second value by writing the second value to the second memory device.

8. The process of claim 7, wherein writing the second value to the second memory device comprises executing one or more software instructions by a central processing unit (CPU) coupled to the second memory device.

9. The process of claim 1, further comprising:
detecting an interruption of electrical power coupled to the first memory device; and
copying a current time value and the current set of data values to the first memory device in response to detecting the interruption of the electrical power coupled to the first memory device.

* * * * *